Aug. 25, 1936.   W. J. WOODS   2,052,269
APPARATUS FOR DRAWING THERMOMETER TUBING
Filed July 5, 1934   3 Sheets-Sheet 1

INVENTOR.
WILLIAM J. WOODS
BY
ATTORNEYS.

Aug. 25, 1936.     W. J. WOODS     2,052,269
APPARATUS FOR DRAWING THERMOMETER TUBING
Filed July 5, 1934     3 Sheets-Sheet 2
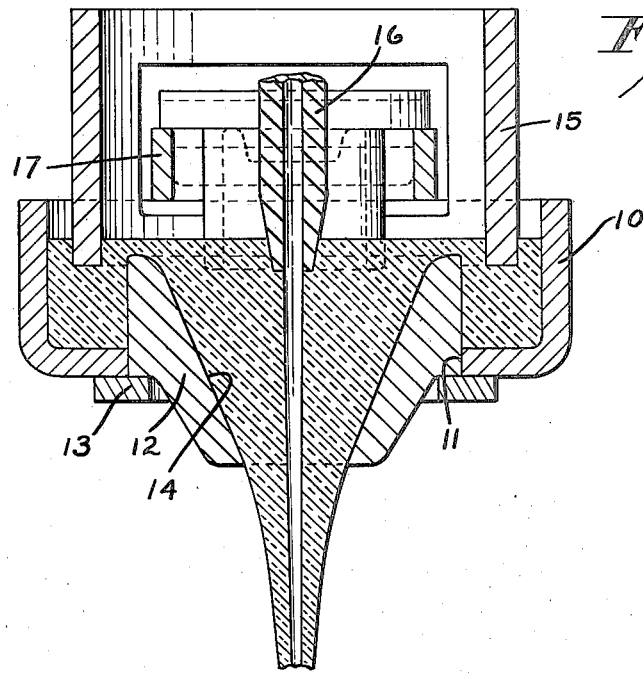
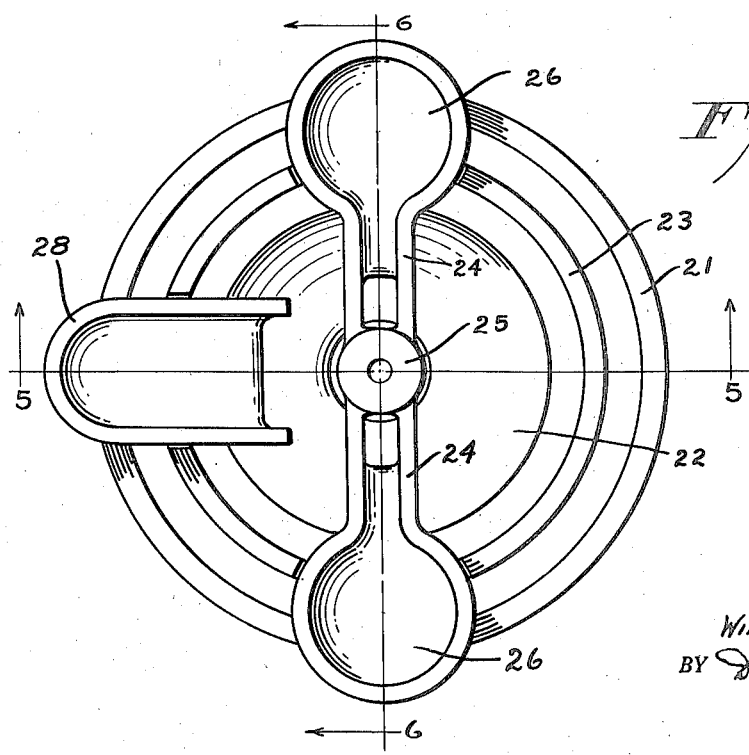
INVENTOR.
WILLIAM J. WOODS
BY
ATTORNEYS.

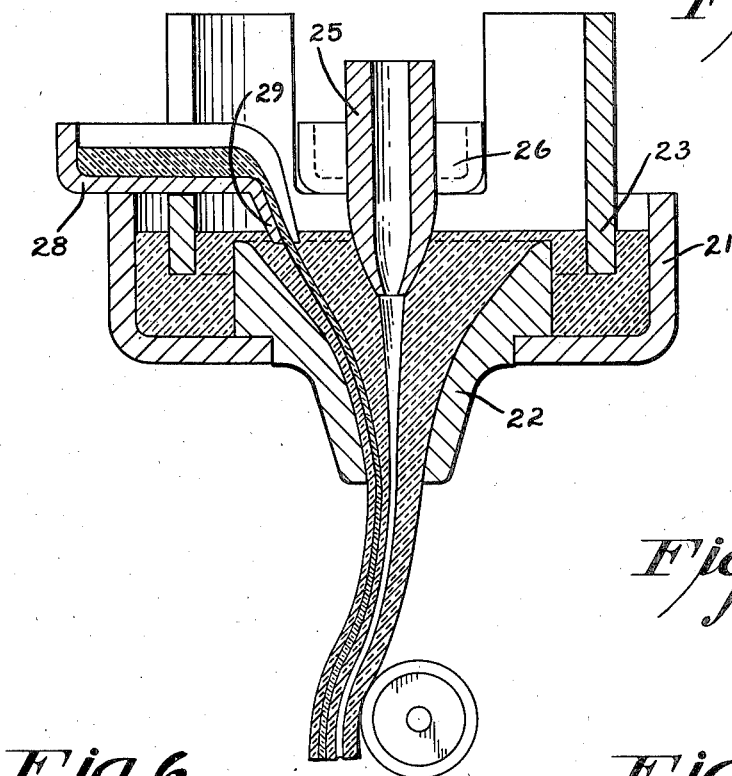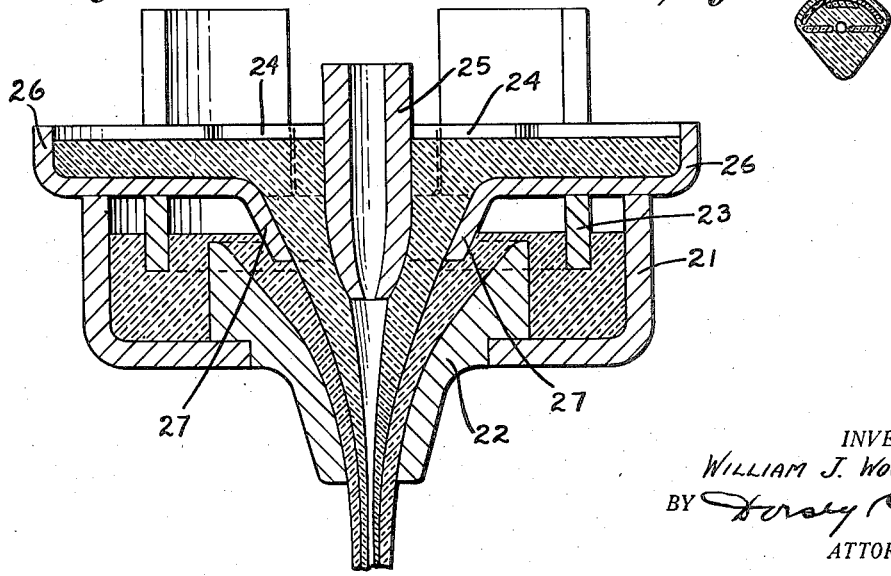

Patented Aug. 25, 1936

2,052,269

UNITED STATES PATENT OFFICE 2,052,269

APPARATUS FOR DRAWING THERMOMETER TUBING

William J. Woods, Corning, N. Y., assignor to Corning Glass Works, Corning, N. Y., a corporation of New York Application July 5, 1934, Serial No. 733,924

6 Claims. (Cl. 49—17.1)

This invention relates to glass tubing and more particularly to tubing containing a stripe or layer of contrasting glass beneath its surface.

The object of this invention is to facilitate the rapid production of glass tubing containing a stripe of contrasting glass which will be located accurately with reference to the bore.

Another object is to control the cross-sectional shape and size of the tubing so that instrument tubing, such as that employed in the manufacture of thermometers, may be produced.

A still further and highly important object of my invention is the production of instrument tubing having a clear, unobstructed, and accurate bore so that when indicating fluid, such as mercury, is introduced into it, the latter will flow freely from one end to the other.

Among its features my invention embodies a bowl for containing molten glass, which bowl is provided with a bottom outlet shaped to conform to the cross-section of the tubing to be drawn, filling hoppers at spaced intervals around the periphery of the bowl through which the clear glass is introduced into the bowl and one or more hoppers spaced inwardly from the periphery of the bowl for containing a quantity of contrasting glass, the last named hoppers having their outlet ends disposed below the surface of the glass in the bowl so that as the glass flows through the outlet a stripe of contrasting glass will flow with it.

In the drawings:

Fig. 3 is a vertical sectional view taken on the line 3—3 of Fig. 1;

Fig. 4 is a plan view of a modified form of drawing bowl embodying my invention;

Fig. 5 is a sectional view taken on the line 5—5 of Fig. 4;

Fig. 6 is a sectional view at right angles to Fig. 5 and taken on the line 6—6 of Fig. 4;

Fig. 7 is a transverse sectional view of one type of tubing which may be drawn using my improved apparatus (Hespe Red Stripe); and Fig. 8 is a similar view of another type of tubing which may be drawn using my improved apparatus (Moeller).

Figure 1:
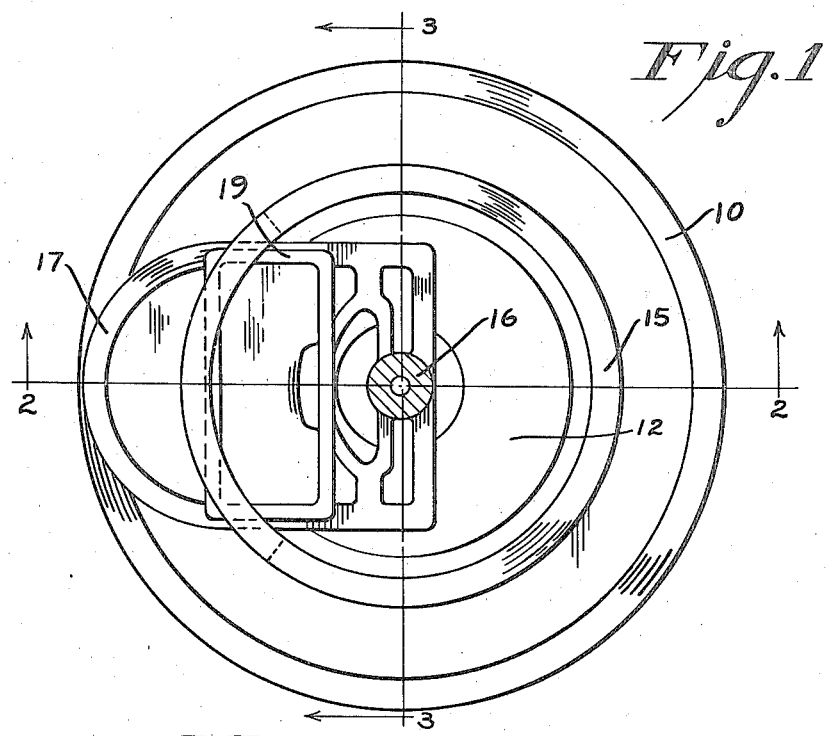
Fig. 1 is a plan view of a glass drawing bowl embodying my invention.

Referring to the drawings in detail, a glass drawing bowl 10 is supported in any suitable heating device such as is commonly employed in the glass art and, therefore, is not shown. The bowl 10 is provided with a relatively large bottom opening 11 into which a refractory glass shaping sleeve 12 is fitted. As shown, this sleeve 12 is supported about midway of its length by a supporting ring 13 and in such a position that its upper end is considerably above the level of the bowl bottom while its lower end extends well below the lower end of the bowl. The sleeve 12 is provided with an internal opening 14 which tapers toward the lower end which is of a cross-section suitable for producing the desired shape in the finished tubing. There is thus produced a funnel shaped passage through which the molten glass is drawn downwardly and an upstanding curb within the bowl over which the glass flows as it enters the opening 14.

Surrounding the upper end of the sleeve 12 but in spaced relation to it and the sides of the bowl is a conditioning sleeve 15 which acts to prevent surface glass within the bowl 10 from entering the opening 14 and, also, by properly controlling the temperature within the sleeve, that portion of the glass within it may be properly conditioned for drawing.

Supported from above and extending into the glass within the conditioning sleeve 15 is an air nozzle 16 by means of which bore forming air may be introduced into the glass as it is being drawn and supported above the bowl and resting on its upper edge is a container 17 for molten glass of a variety which differs from that in the bowl 10. The container 17 is provided with a depending nozzle 18 which extends below the surface of the glass in the bowl 10 so that a stripe of contrasting glass may be introduced into the tubing as it is being drawn.

Figure 2:
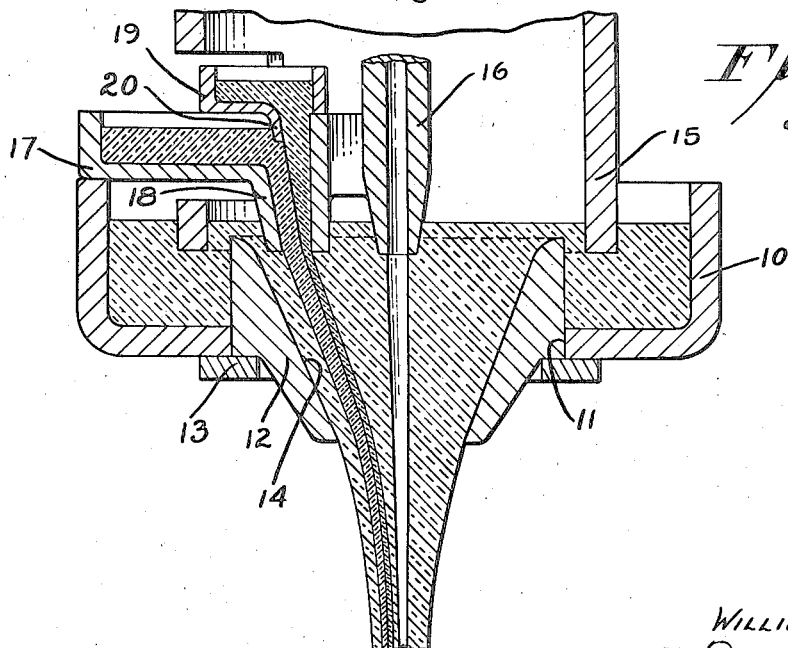
Fig. 2 is a vertical sectional view taken on the line 2—2 of Fig. 1.

In some instances it is desirable to introduce a stripe of a still different variety of glass into the tubing between its bore and the first mentioned stripe of contrasting glass. This may be accomplished by supporting a molten glass container 19 above the container 17 and providing the latter with a nozzle 20 which extends downwardly slightly below the surface of the glass in the container 17. In such an event the glass issuing from the nozzle 20 will be in direct contact with that issuing from the container 17 and the resulting stripes will lie adjacent one another and in spaced relation to the bore as illustrated in Fig. 2.

In certain instances it is desirable to introduce what are known in the art as light shields into the tubing on opposite sides of the bore and for this purpose I employ the apparatus illustrated in Figs. 4 to 6, inclusive. In this form of my invention a bowl 21, sleeve 22, and conditioning sleeve 23, similar to the bowl 10, sleeve 12, and conditioning sleeve 15, are employed and supported above the bowl and extending transversely of it is a glass containing trough 24 which carries intermediate its ends an air nozzle 25 through which bore forming air is admitted to the glass as it is being drawn. This trough 24 is provided at opposite ends with enlargements forming reservoirs 26 for a variety of glass which contrasts with that in the bowl 21 and which is fed through the trough toward the nozzle 25 and thence downwardly through nozzles 27 below the surface of the glass in the bowl 21 to form stripes which radiate outwardly from diametrically opposite points on the bore and thus form light shields in the finished tubing as illustrated in Fig. 8. In order to introduce a contrasting stripe back of the bore, a container for holding molten contrasting glass 28 is supported above the bowl 21 at the desired point and is provided with a depending nozzle 29 which extends downwardly slightly below the surface of the glass in the bowl 21.

Obviously, the lower ends of the nozzles 16, 18, 20, 25, 27 and 29 can be shaped so as to control the issue of fluid therethrough and, consequently, the cross-sections of the bores and stripes in the finished tubing can be made to suit varying requirements.

In operation, molten glass is admitted to the bowl from any suitable source such as by ladling or flowing a continuous stream through any suitable feeding means (not shown). The glass rising in the bowl reaches a level which exceeds the height of the curb formed by the drawing sleeve so that it then flows over the curb and into the drawing sleeve. The conditioning sleeve acts to prevent surface glass from entering the drawing sleeve and by proper control of the temperatures within the conditioning sleeve the glass may be conditioned for drawing. Flowing around the air nozzle, the air entering the glass therethrough will form a bore and issuing through the lower end of the drawing sleeve the desired external shape is imparted to the tube which may then be drawn down by any suitable drawing device (not shown) to the desired size. As the glass within the conditioning sleeve is drawn downwardly through the drawing sleeve, such contrasting glass as may be contained in the various containers above described will flow through the respective nozzles and enter the glass which is being drawn to form stripes of contrasting glass, the cross-sections of which are controlled by the cross-sectional shapes of the nozzles through which they pass.

While in the foregoing there has been shown and described the preferred embodiment of my invention, it is to be understood that minor changes in the details of construction, combination, and arrangement of parts may be resorted to without departing from the spirit and scope of my invention as claimed.

What is claimed is:

1. In a glass drawing apparatus a bowl containing molten glass, said bowl having a bottom outlet through which the glass issues, a nozzle aligned with the bottom outlet for introducing bore forming air into the glass as it issues, a container for contrasting glass extending from the nozzle and resting on the upper edge of the bowl and a glass discharge nozzle on the last named container having its lower end submerged below the surface of the glass in the bowl.

2. In a glass drawing apparatus a bowl containing molten glass, said bowl having a bottom outlet through which the glass issues, a nozzle aligned with the bottom outlet for introducing bore forming air into the glass as it issues, a container for contrasting glass extending from the nozzles and resting on the upper edge of the bowl, a nozzle on the last named container near the end supported by the first mentioned nozzle, said last named nozzle having its lower end submerged below the surface of the glass in the bowl for introducing a stripe of contrasting glass into the glass as it issues from the bowl.

3. In a glass drawing apparatus a bowl containing molten glass, said bowl having a bottom outlet through which the glass issues, an air nozzle supported above the glass in the bowl in alignment with the bottom outlet, the lower end of said nozzle being submerged beneath the surface of the glass for introducing bore forming air as it issues through the bottom outlet, a container for contrasting glass extending from the nozzle and resting on the upper edge of the bowl and a nozzle on the container immediately adjacent the first mentioned nozzle.

4. In a glass drawing apparatus a bowl for containing molten glass, a drawing sleeve having a bottom outlet for shaping the glass as it issues therefrom, said drawing sleeve projecting into the bowl so as to form a curb over which the glass within the bowl must flow before entering the drawing sleeve, a conditioning sleeve surrounding the drawing sleeve in spaced relation thereto and to the sides of the bowl, an air nozzle supported above the glass in the bowl with its lower end submerged beneath the surface of said glass for introducing bore forming air thereinto, a container for contrasting glass supported above said bowl, a nozzle on the container extending downwardly below the surface of the glass in the bowl to introduce a stripe of contrasting glass into the tubing as it is being drawn, a second container for a still different variety of glass supported above that containing the contrasting glass and a nozzle on the last named container for directing the glass therein contained into the contrasting glass as it flows from its container and into the bowl.

5. The combination with a glass drawing bowl having a bottom outlet through which the glass issues, of a nozzle entering the bowl from above for introducing bore forming air into the glass as it is being drawn through said outlet, containers for contrasting glass supported above the level of the glass in the bowl in diametrically opposite relation, and nozzles on the containers for introducing diametrically opposed stripes of contrasting glass into the glass of the bowl on opposite sides of the bore.

6. The combination with a glass drawing bowl having a bottom outlet, of a trough supported by the upper edge of the bowl, a nozzle carried by the trough and entering the bowl from above for introducing bore forming air into the glass as it is being drawn through said sleeve, containers for contrasting glass at opposite ends of the trough, nozzles carried by the trough for introducing diametrically opposed stripes of contrasting glass into the glass of the bowl on opposite sides of the bore, a container supported on the upper edge of the bowl between the containers for the contrasting glass and a nozzle on the last named container to introduce a stripe of contrasting glass into the glass of the bowl directly to one side of the bore.

WILLIAM J. WOODS.